US005564072A

United States Patent [19]
Garcia Aguilera et al.

[11] Patent Number: 5,564,072
[45] Date of Patent: Oct. 8, 1996

[54] FIXED CELLULAR COMMUNICATIONS SYSTEM

[75] Inventors: Jose Maria Garcia Aguilera; Miguel Rodriguez-Palanca Pliego; Francisco C. Beneyto; Juan A. Garcia Perez, all of Madrid, Spain

[73] Assignee: Alcatel N.V., Rijswijk, Netherlands

[21] Appl. No.: 314,888

[22] Filed: Sep. 29, 1994

[30] Foreign Application Priority Data

Sep. 30, 1993 [ES] Spain .................................... P9302065
Sep. 30, 1993 [ES] Spain .................................... P9302066

[51] Int. Cl.$^6$ ................................................ H04B 7/00
[52] U.S. Cl. ........................ 455/56.1; 455/7; 455/33.1; 379/59; 379/61; 375/342
[58] Field of Search ................................ 455/33.1, 33.4, 455/53.1, 54.1, 54.2, 56.1, 11.1, 7; 379/58, 59, 61, 57; 375/95.1, 95.3

[56] References Cited

U.S. PATENT DOCUMENTS

| | | |
|---|---|---|
| 4,658,096 | 4/1987 | West, Jr. et al. |
| 4,748,655 | 5/1988 | Thrower et al. .......................... 379/57 |
| 5,276,686 | 1/1994 | Ito ........................................... 455/33.1 |
| 5,351,270 | 9/1994 | Graham et al. ........................... 379/61 |
| 5,418,839 | 5/1995 | Knuth et al. ............................. 379/61 |

*Primary Examiner*—Reinhard J. Eisenzopf
*Assistant Examiner*—Doris To
*Attorney, Agent, or Firm*—Ware, Fressola, Van Der Sluys & Adolphson

[57] ABSTRACT

A fixed cellular communications system consisting of a cellular mobile communications network (CS) that provides coverage of voice and/or data communications services to terminals located in a set of cells in any one of which there can be at least one fixed cellular terminal (4) that communicates, on one side, by radio, with one of the base stations (3) of the cellular mobile communications network (CS) and on the other side, by cable, with at least one base station (6) of a cordless communications system (WS) through control and interface means that perform the adaptation between the two systems to provide communications services to a number of cordless terminals (7). When the cellular communication system (CS) makes use of a time division multiple access technology, for example GSM, one single radio transceiver is connected to a transceiver control means to manage the radio channel allocations, so that it can simultaneously support as many communications channels as possible without there being temporal overlapping of channels.

3 Claims, 5 Drawing Sheets

FIXED CELLULAR COMMUNICATIONS SYSTEM

TECHNICAL FIELD

This invention concerns a communications system for the provision of voice and/or data services to a set of terminals either in the form of telephones or of any other kind (facsimile machines, data modems, etc.), in environments where there is still no fixed communications infrastructure, or where the latter is already saturated and an operational "island" is planned where this communications service will be offered.

The system described in this document is of particular interest in areas where there exists coverage by some cellular mobile service, though it also is of great interest in places where there is no such service and an installation is urgently required or where the cost of providing communications service with this invention would be less than with a fixed service.

BACKGROUND OF THE INVENTION

The problem of providing a communications service in a very short time in certain environments where there is still no infrastructure (as usually occurs in new development areas outside large cities), or in places where there already exists such an infrastructure but which is now saturated, has resulted in numerous resources having been dedicated to the definition and design of specific networks that provide a solution for this situation, this solution being preferably based on existing networks or new ones that are easy and quick to install.

Since the introduction of cellular mobile systems, their use has been extended to other purposes than those for which they were originally conceived. One of the most attractive from the point of view outlined above is that known as a "fixed cellular network", which is based on the use of terminals compatible with the cellular network of which it makes use, in a fixed environment. The antenna of the system is usually lodged in a fixed site (normally on roofs) and is usually of the directional type, pointed towards the base station that covers the cell in which it is located.

All this is explained in the U.S. Pat. No. 4,658,096, in which the base stations of a cellular system communicate with fixed cellular terminals that comprise the corresponding interface systems each of which offers a single subscriber line to which may be connected a standard telephone, as well as with the corresponding cellular mobile terminals. In the same document a configuration is also shown in which a communications service is provided for a number of standard telephones, all of the latter being connected to a unit that acts as a concentrator for sharing the communications channels offered by a smaller number of fixed cellular terminals and thereby optimising the existing resources.

The fixed cellular terminals, as indicated in above patent, provide as many subscriber lines as there are cellular transceivers. When a greater number of subscriber lines is needed, some cellular transceivers are grouped.

This kind of fixed cellular service is an alternative available to telecommunications operators who wish to offer their services in determined environments rapidly, and which must desirably be completely transparent for the user in all aspects like, for example, numbering, charging, etc.

On the other hand, this type of fixed cellular terminal does not make use of the features of mobility between cells, roaming for the mobile terminal, etc., consequently the use of cellular service channels does not detract significantly from the potential of the cellular mobile system as such, since the load of "fixed" channels occurs only on one base station, and their maximum number is limited and known.

Nonetheless, optimum economic benefit is not achieved by the prior art because it is necessary to construct a local infrastructure in the subscribers' building in order to distribute the available lines over the set of fixed cellular terminals and have the same number of telephone sets (or terminals of a different type) as fixed cellular terminals in order to cover the communications requirements of the local system.

SUMMARY OF THE INVENTION

The communications system according to this invention comprises a cellular mobile communications network that offers communications coverage for voice and/or data services, in which in one of its cells there is at least one fixed cellular terminal that communicates, by radio, with one of the base stations of the cellular system and wherein this fixed cellular terminal is joined to at least one base station of a cordless communications system through control and interface means in order to carry out the matching operations between the two systems and, optionally, concentration of the number of communications channels offered to the number of channels available in order to provide in this way a communications service to a number of cordless terminals.

The fixed cellular terminal so formed comprises one or more cellular mobile terminal transceivers, one or more base station transceivers of a cordless communications system and control and interface means that incorporate the matching functions between the two transceivers of the cellular and cordless systems, for both analogue and digital systems.

When the cellular radio transceiver is of the type of time division multiple access, TDMA, transceiver control means manage the radio channels allowing that they can support simultaneously as many communication channels as possible without temporal overlapping of channels.

As a result of the application of this invention, a communications system is made available that can be quickly implemented, is inexpensive, and can provide a number of subscribers with a mobile service within a limited environment, and that permits optimisation of the available resources in terms of the number of communications channels offered.

BRIEF DESCRIPTION OF THE DRAWINGS

A fuller explanation of the invention can be found in the description of the invention based on the accompanying figures in which.

BEST MODE FOR CARRYING OUT THE INVENTION

Figure 1:
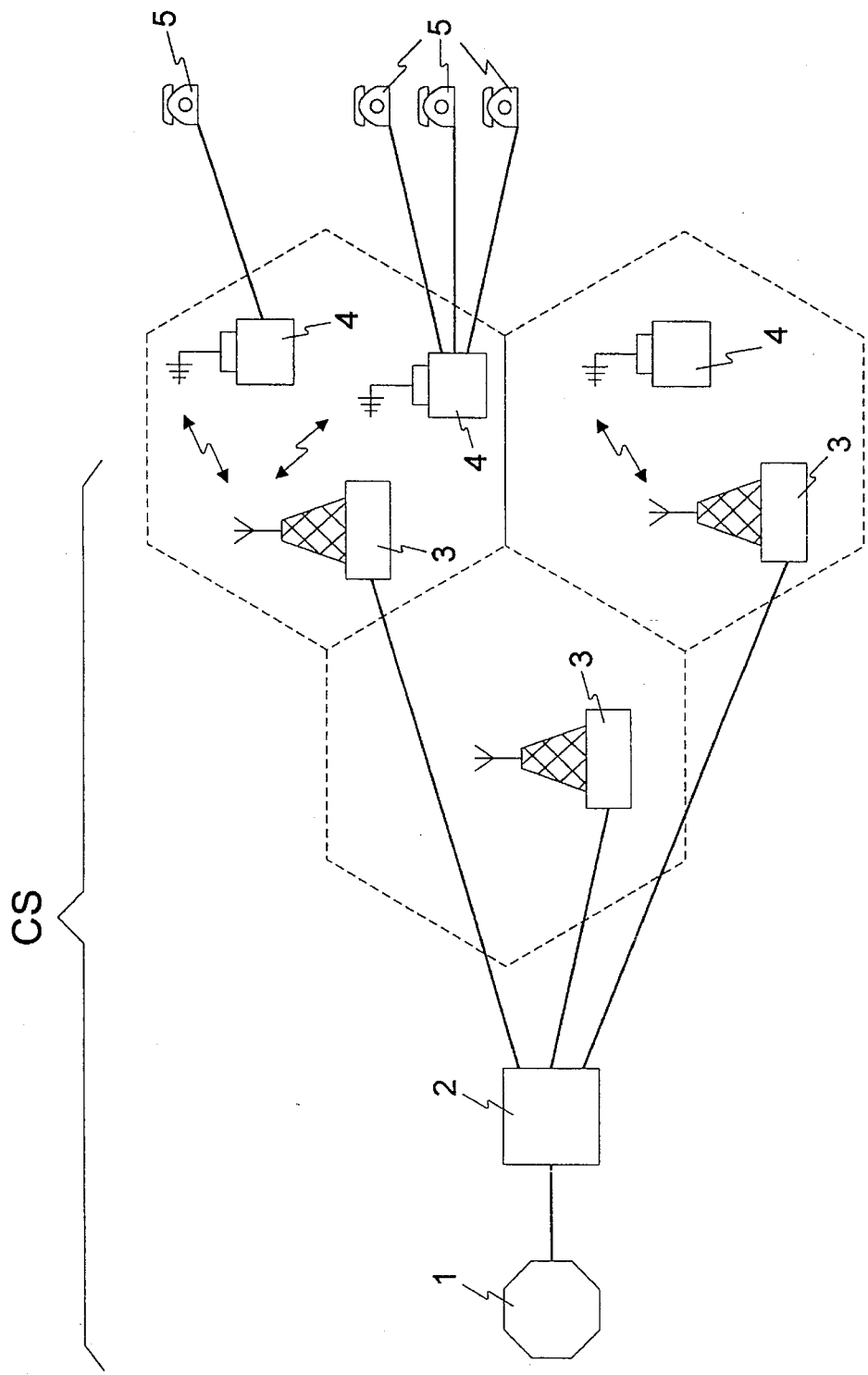
FIG. 1 shows the layout of a communications network based on a cellular system with fixed cellular terminals and fixed local infrastructure.

According to the state of the art, there exists a cellular mobile communications network CS which has a mobile switching centre 2 that is connected to a more extensive communications network, for example, the public switching network 1. To this mobile switching centre 2 is connected a set of base stations 3 belonging to the cellular mobile communications network CS, which are spread over a determined zone to provide it with cellular coverage.

In addition, though not indicated, there is a set of required functional units, including base station controllers, maintenance centre, charging centre, etc.

With such an infrastructure already existing, it is possible to set up communications links between a mobile unit that is situated in any of the defined cells and the base station 3 of the mobile cellular communications network CS corresponding to this cell.

For a preferred embodiment of the invention, the fixed cellular terminal consists of a cellular terminal essentially of the standard type but to which is coupled a fixed directional antenna whose main lobe points to the base station with which it establishes communication, and control and interface means 9 (shown in FIG. 3) to make a communications channel available. Next, as is shown in FIG. 2, a base station 6 of a cordless communications system WS is connected to the control and interface means so that a set of cordless terminals 7, either of the telephone type or of any other kind, can gain access to an available communications channel in the cellular mobile communications network CS through the equipment so arranged and which is termed a fixed cellular terminal 4, so that this cordless communications system WS can also be used as a local branch exchange for internal communications.

Figure 2:
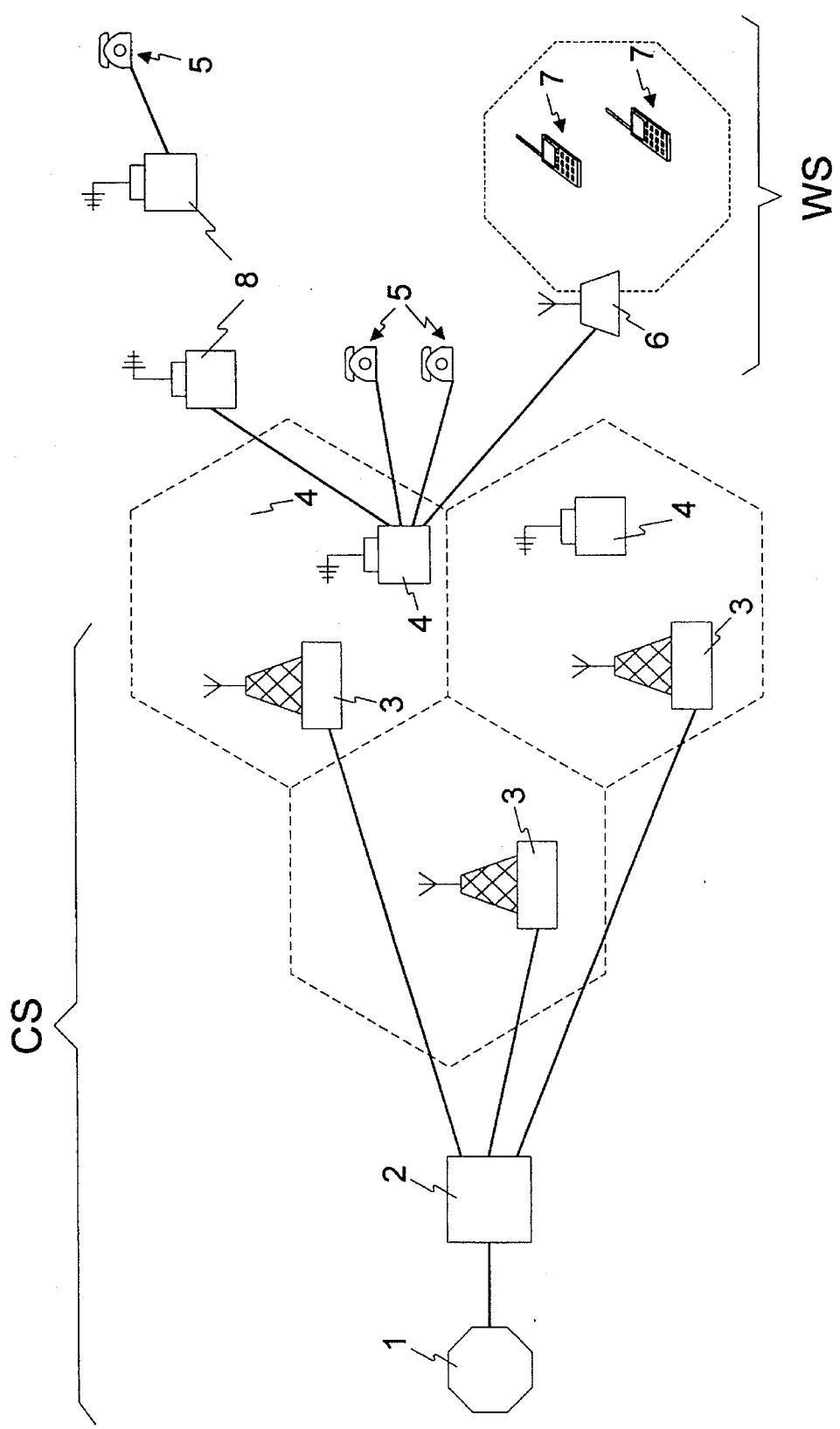
FIG. 2 shows an alternative configuration according to the instant invention, in which the fixed infrastructure in the subscriber building has been replaced by a cordless communications system.

This arrangement is also compatible with another set of conventional telephones 5 or other type of fixed terminals that can have access to the communications channel of the fixed cellular terminal 4 either through a direct connection to a subscriber line or through an intervening radiolink as is indicated in FIG. 2, by means of corresponding radiolink equipments 8.

Figure 5:
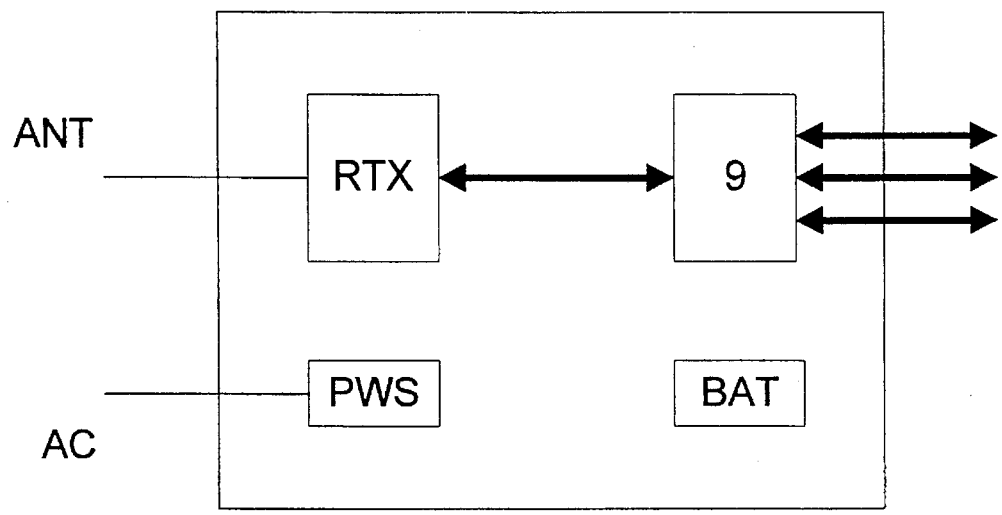
FIG. 5 shows the block diagram of a fixed cellular terminal for a single communications channel available according to the state of the art.

One single fixed cellular terminal 4, as shown in FIG. 5, comprises a radio transceiver RTX which is connected to the antenna ANT to communicate, via radio, with a base station 3 and to control and interface means 9 (here included in the same housing) to provide a communication channel to a greater number of subscribers. It also comprises a power supply unit PWS that is connected to the mains AC and a battery system BAT for supplying the unit in case that the mains AC is out of service.

These communication channels provided by the control and interface means 9 are used for providing subscriber tines to the base station 6 of a cordless communications system WS (FIG. 3) and to standard telephones 5 in a direct way or through radiolink equipments 8.

When the resulting system has to be dimensioned for a traffic level greater than what a single communications channel of the cellular mobile communications network CS can support, it is possible to centralise the channels offered by various mobile terminals so that, by means of the aforementioned control and interface means 9 that incorporate the previously described functions, they offer a greater number of communications channels.

Figure 6:
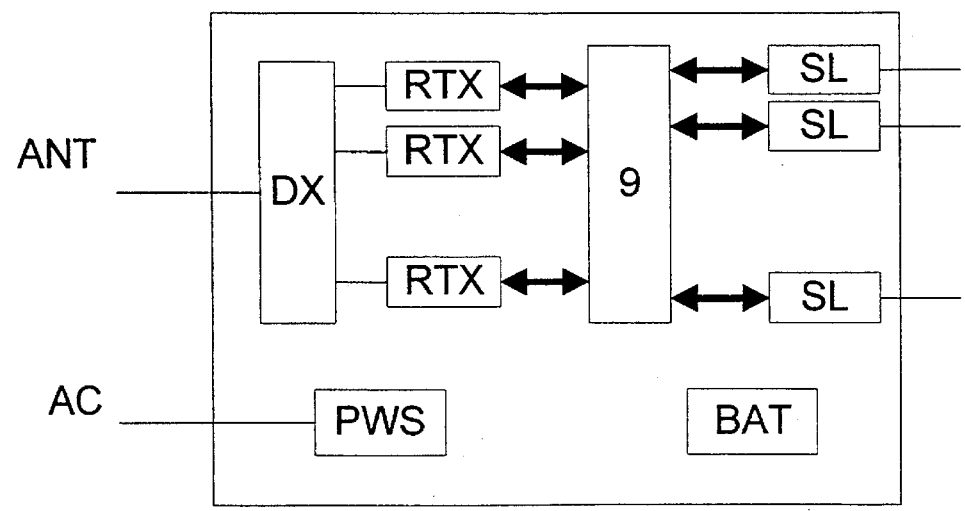
FIG. 6 shows the block diagram of a multi-subscriber fixed cellular terminal that has a certain number available of communications channels according to the instant invention.

This is shown in FIG. 6, where several radio transceivers RTX are connected, in one part, to the antenna ANT through a duplexor DX and, in the other part, to the control and interface means 9 to provide a greater number of telephone lines by means of corresponding subscriber line interfaces SL.

Although the number of mobile terminals used, and consequently the maximum number of communications channels available is superior to one, in a system like that described it is normal to house them in a single rack with a common power supply. Therefore the fixed cellular terminal 4 so formed is of the multisubscriber type, and this terminal is to be understood in a broad sense and independent of the number of mobile terminals that it has and/or channels available.

The control and interface means 9 perform, among others, the functions of numbering conversion (when this is necessary) between the cellular system and the system used in the public switching network, as well as other adaptations required to the signals (levels, types, codes).

Figure 3:
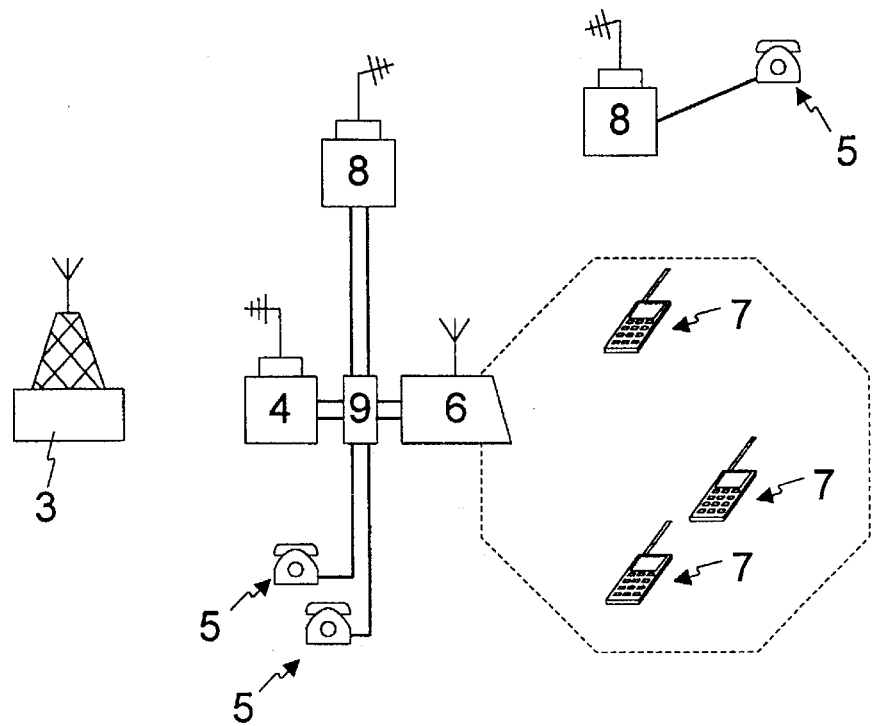
FIG. 3 shows the arrangement with a fixed cellular terminal, the base station of a cordless communications system, and the control and interface means between the two.
Figure 4:
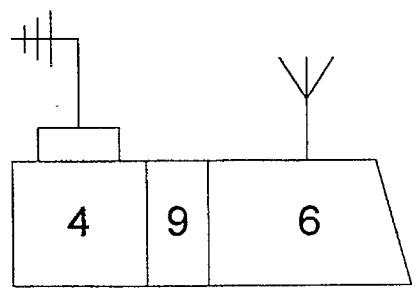
FIG. 4 shows the constitution of an integrated fixed cellular equipment, consisting of a radio transceiver compatible with the cellular one, the control and interface means, and a radio transceiver compatible with the cordless communications system, according to the instant invention.

The channels available, as shown in FIG. 3, are connected to the base station 6 of a cordless communications system WS, for which the aforementioned control and interface means 9 also perform the adaptation of signals between the cellular and cordless systems so that handshaking can take place between the two systems.

Figure 7:
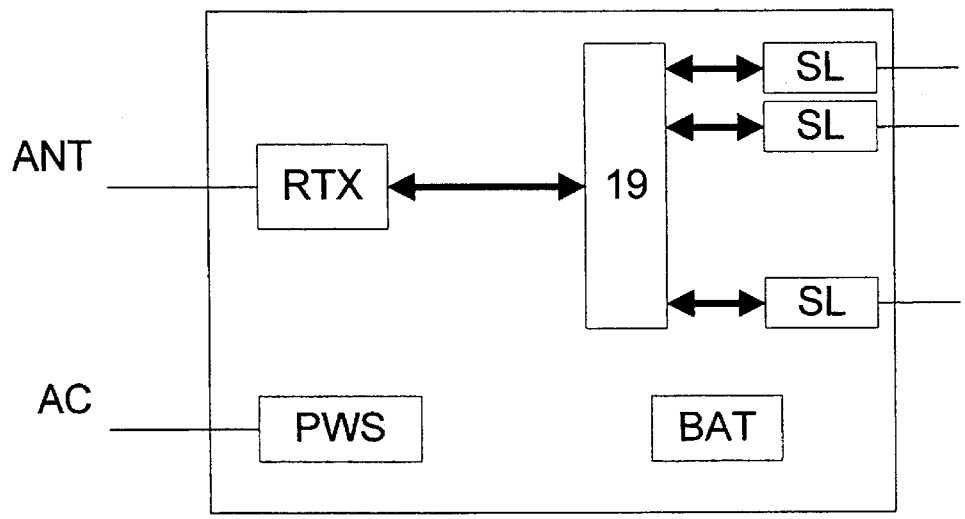
FIG. 7 shows the block diagram of a multi-subscriber fixed cellular terminal according to the instant invention.

Nevertheless, when the cellular system is based on time division multiple access, (TDMA) technology, the radio transceiver RTX incorporated in these terminals only works during the corresponding part of a data burst because this is how the controller for this transceiver operates. For the fixed cellular terminal of the invention, as can be observed in FIG. 7, a cellular radio transceiver RTX is used, of the type employed for cellular mobile terminals of GSM type for instance, but to which transceiver control means 19 are connected to manage the radio channels so that the assembly so formed can, at most, support as many communications channels as there are bursts defined per frame in the TDMA system.

Figure 8:
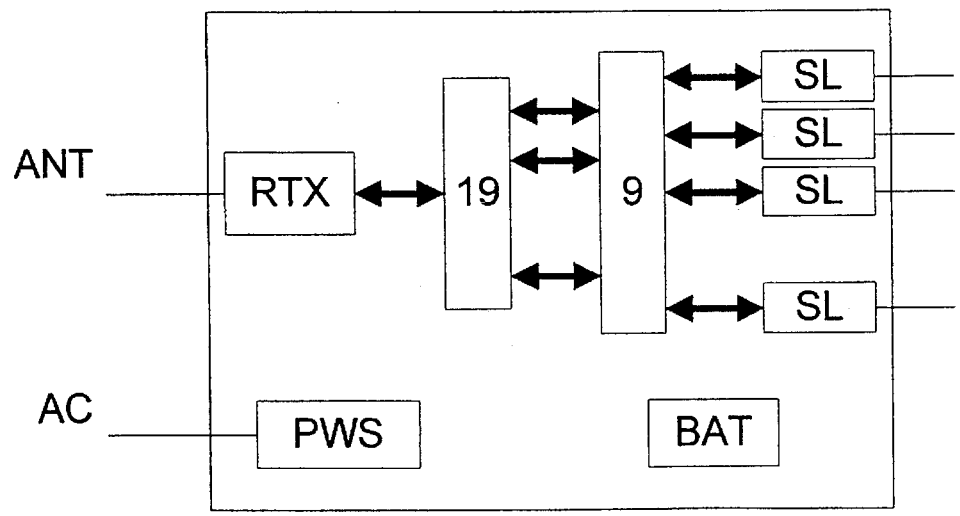
FIG. 8 shows the block diagram of above multi-subscriber fixed cellular terminal including concentrating means in order to extend the number or subscriber lines, according to the instant invention.

The aforementioned transceiver control means 19 can also perform channel concentrating functions in order to make available an even greater number of subscriber lines, or this function may be incorporated later in the control and interface means 9, as shown in FIG. 8.

This adaptation function carried out by the control and interface means 9, must be transparent to the end user so that both the subscriber numbers and the charging carried out by the operators are the same as if the connection to the public switching network were made directly.

If the number of channels available were still insufficient, clearly use would be made of similar, new transceivers in order to achieve a greater number of communications channels and in which the control means would manage the total set of cellular radio transceivers.

Finally, one of the cellular radio transceivers could be of another type that is compatible, not with the cellular network employed up until now, but with a second network either cellular or of another type in order to provide a certain number of alternative channels not dependent on the availability of channels in the cell where this fixed cellular terminal is located.

We claim:

1. A fixed cellular terminal for use in a cellular mobile communications network (CS) that employs time division multiple access (TDMA) technology, the fixed cellular terminal for providing voice and/or data communications to one or more subscribers through one or more conventional subscriber lines, characterized in that the fixed cellular terminal comprises at least one cellular transceiver (RTX) employing TDMA technology for wireless communication with the cellular mobile communications network (CS), a transceiver control means (19) connected to the cellular transceiver (RTX) to manage a plurality of communication channels so that a number of the subscriber lines can simultaneously utilize communication channels of the cellular mobile communications network, and a control and interface means (9) connected to the transceiver control means and to the subscriber lines, so as to concentrate the channels associated with the subscriber lines to the channels provided by the transceiver control means (19), and also to set up internal communications between the subscriber lines without making use of communication channels of the cellular mobile communications network.

2. A fixed cellular terminal according to claim 1, comprising a plurality of cellular transceivers connected, on the radio frequency side, to a single antenna system (ANT).

3. A fixed cellular terminal according to claim 2, characterized in that it also communicates with a second communications network with cellular access or with another type of communications network through point to point or point to multipoint radiolinks in order to provide alternative communication channels.

* * * * *

UNITED STATES PATENT AND TRADEMARK OFFICE
CERTIFICATE OF CORRECTION

PATENT NO. : 5,564,072
DATED : October 8, 1996
INVENTOR(S) : Jose M. GARCIA AGUILERA, Miguel RODRIGUEZ-PALANCA PILIEGO, Francisco CLIMENT BENEYTO and Juan A. GARCIA PEREZ It is certified that error appears in the above-indentified patent and that said Letters Patent is hereby corrected as shown below:

On the Title Page:

Item [75] Inventors:

"Francisco C. Beneyto" should be --Francisco Climent Beneyto--.

Signed and Sealed this

Twenty-fourth Day of December, 1996

*Attest:*

BRUCE LEHMAN

*Attesting Officer*     *Commissioner of Patents and Trademarks*